United States Patent
Legan et al.

(10) Patent No.: US 10,856,468 B2
(45) Date of Patent: Dec. 8, 2020

(54) DROP HANDLE MOWER

(71) Applicant: MTD PRODUCTS INC, Valley City, OH (US)

(72) Inventors: Jeffery Legan, Valley City, OH (US); Timothy Dilgard, Ashland, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 16/180,100

(22) Filed: Nov. 5, 2018

(65) Prior Publication Data
US 2019/0133036 A1 May 9, 2019

Related U.S. Application Data

(60) Provisional application No. 62/581,468, filed on Nov. 3, 2017.

(51) Int. Cl.
| | | |
|---|---|---|
| *A01D 34/82* | (2006.01) | |
| *A01D 34/68* | (2006.01) | |
| *A01D 34/67* | (2006.01) | |
| A01D 101/00 | (2006.01) | |

(52) U.S. Cl.
CPC .......... *A01D 34/824* (2013.01); *A01D 34/67* (2013.01); *A01D 34/68* (2013.01); *A01D 2034/6843* (2013.01); *A01D 2101/00* (2013.01)

(58) Field of Classification Search
CPC .............. A01D 34/824; A01D 34/67; A01D 2034/6843; A01D 2101/00
See application file for complete search history.

(56) References Cited

U.S. PATENT DOCUMENTS

| | | | |
|---|---|---|---|
| 2005/0188664 A1* | 9/2005 | Clarke ............... | A01D 34/824 56/14.7 |
| 2006/0053762 A1 | 3/2006 | Stover et al. | |
| 2013/0046448 A1* | 2/2013 | Fan .................. | A01D 34/68 701/50 |
| 2013/0111867 A1* | 5/2013 | Schmalz ............ | F02M 37/007 56/255 |
| 2014/0260157 A1* | 9/2014 | Baker ................ | A01D 34/824 56/16.6 |
| 2014/0331809 A1* | 11/2014 | Mikula .............. | A01D 34/824 74/491 |
| 2016/0236640 A1* | 8/2016 | Bartel ................ | A01D 34/824 |
| 2017/0086375 A1* | 3/2017 | Yamaoka ........... | A01D 69/08 |
| 2017/0202138 A1* | 7/2017 | Pellenc ............... | A01D 34/69 |
| 2019/0133036 A1* | 5/2019 | Legan ................ | A01D 34/67 |
| 2019/0230852 A1* | 8/2019 | Curtis ............... | A01D 34/6806 |

FOREIGN PATENT DOCUMENTS

| | | |
|---|---|---|
| EP | 1752036 A1 | 2/2007 |
| EP | 3050422 A1 | 8/2016 |

OTHER PUBLICATIONS

International Search Report in PCT Application No. PCT/US2018/059134 dated Jan. 30, 2019, 10 pages.

* cited by examiner

*Primary Examiner* — Erez Gurari

(74) *Attorney, Agent, or Firm* — Wegman Hessler

(57) ABSTRACT

A walk-behind mower includes a deck. The deck includes a rear portion, a power source attached to the deck, a plurality of wheels attached to the deck, a handle attached to the rear portion of the deck. Structure is included to enable a distal end of the handle to be selectively located in a plurality of positions. The handle extends upward and rearward from the rear portion of the deck.

10 Claims, 9 Drawing Sheets

DROP HANDLE MOWER

RELATED APPLICATIONS

This application claims priority to U.S. Provisional Application No. 62/581,468, filed Nov. 3, 2017, which is hereby incorporated in its entirety by reference.

BACKGROUND

Field of the Disclosure

This application relates generally to lawn maintenance devices and, in particular, walk-behind lawn maintenance devices having a drop handle for use on inclined surfaces.

Description of Related Art

Walk-behind mowers are widely used for cutting grass and other vegetation. From time-to-time, the walk-behind mowers are used on inclined surfaces such as relatively steep hills and the sides of ditches. Oftentimes, the operator stands at a higher elevation position to lower the walk-behind mower down the incline and pull the mower back up the incline in order to cut the grass and other vegetation on the inclined surface(s). Most walk-behind mowers employ handles that are fixed in place and are angled from a mounting location on the deck of the walk-behind lawn mower to a position above and behind the walk behind mower. This handle position is often the best position for typical mowing operations on relatively flat ground surfaces. However, this fixed handle position often causes one or both of two conditions: a) the handle is too high for conveniently pulling the walk-behind mower back up the inclined surface and b) the operator must push down on the handle to lift the front wheels of the walk-behind mower off the ground, thereby limiting the effective cutting operation of the mower. This lack of effective cutting operation can inconvenience the operator, increase the amount of time required to mow a particular turf area, etc.

Therefore, there is a need to provide an improved handle arrangement for walk-behind mowers. This is particularly needed for walk-behind mowers that are used to cut vegetation on inclined surfaces, on the sides of ditches, etc.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

According to one aspect, a walk-behind mower includes a deck, the deck comprising a rear portion, a power source attached to the deck, a plurality of wheels attached to the deck, a handle attached to the rear portion of the deck, the handle including a distal end, and structure to enable the distal end of the handle to be selectively located in a plurality of positions. The handle extends upward and rearward from the rear portion of the deck.

The plurality of positions may include a first position and a second position, the second position being at a lower elevation than the first position.

The structure may include a hinge such that a portion of the handle can rotate the distal end between the plurality of positions.

The structure may include a physical stop such that there is a selected limit to a movement of the handle between the plurality of positions.

The physical stop may be configured to limit the movement of the handle at a bottom limit.

The plurality of positions may include an uppermost position and the structure includes a lock to maintain the handle in the uppermost position.

The walk-behind mower further may include a lever attached to the handle proximate the distal end, wherein the lever may enable movement of the handle between the plurality of positions.

The walk-behind mower further may include a cable, wherein the cable may be connected to the lever and the structure such that motion in the lever urges movement in the cable that urges a motion in the structure.

The handle further may include two sides such that each side is attached to the deck, and a portion of the structure is located on each side of the handle.

The walk-behind mower further may include a lever attached to the handle proximate the distal end, wherein the lever may enable movement of the handle between the plurality of positions.

The walk-behind mower further may include two cables, wherein the cables may be connected to the lever and to each portion of the structure such that motion in the lever may urge movement in the cables that urge a motion in each structure.

According to yet another aspect, a walk-behind mower includes a deck, a power source attached to the deck, a plurality of wheels attached to the deck, and a handle attached to the rear portion of the deck and configured for being selectively located in a plurality of positions. The wheels located at the front of the deck have a rounded cross-sectional profile to limit the contact area between the wheel and a driven surface.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

The structure, operation, and advantages of the presently disclosed embodiment of the disclosure will become apparent when consideration of the following description taken in conjunction with the accompanying drawings wherein.

Corresponding reference characters indicate corresponding parts throughout the views of the drawings.

DETAILED DESCRIPTION

Figure 1:
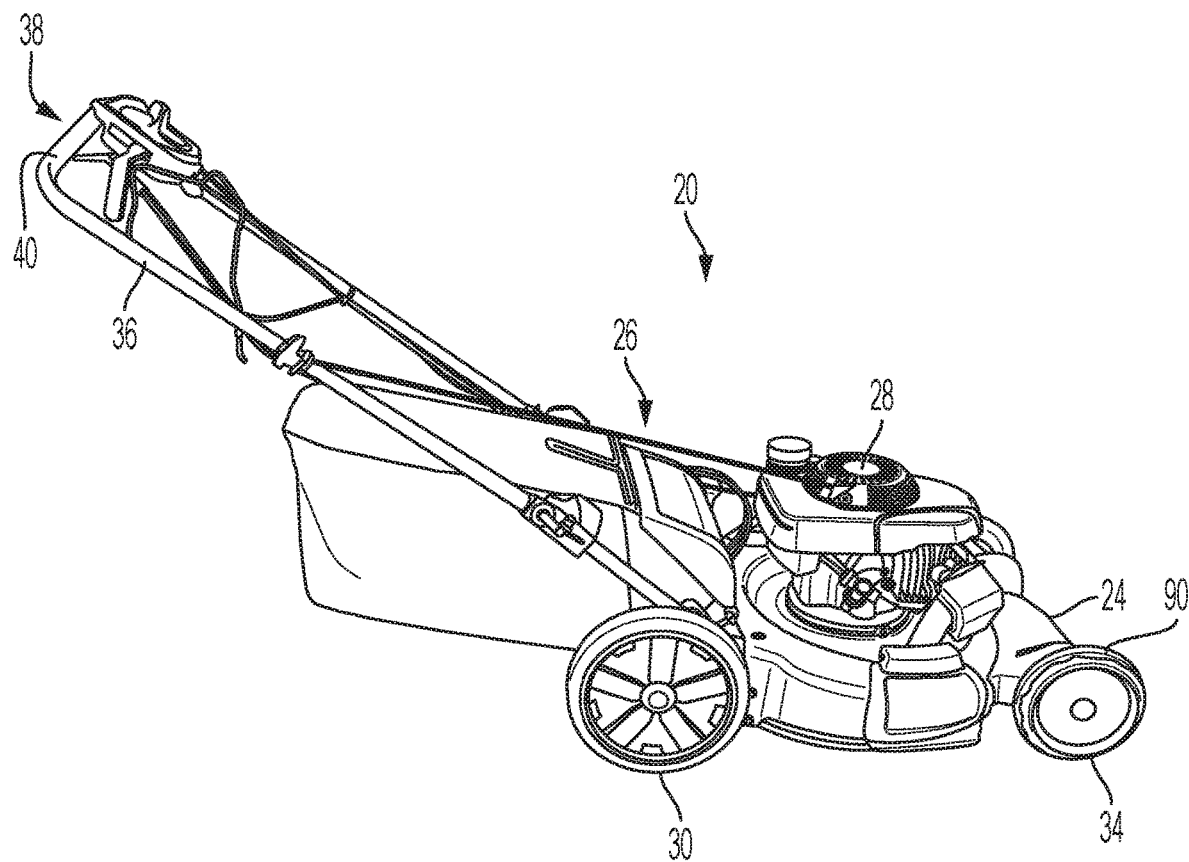
FIG. 1 is a side view of a walk-behind mower in accordance with an exemplary embodiment of the disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Referring now to the drawings, FIG. 1 illustrates a walk-behind mower 20 in accordance with an exemplary embodiment of the present disclosure. The mower 20 includes a deck 24 which can also act as a frame for major components of the mower 20. The deck includes a rear portion 26. A power source 28 is attached to the deck 24 for operation of the mower blade (not shown) and any other accessories that may be attached to the mower 20. While a gasoline-powered internal combustion engine is shown in the figures, any suitable power source is acceptable, including an electric motor, battery powered motor, etc. A plurality of wheels are attached to the deck to ease motion of the mower 20. The mower 20 can include two rear wheels 30 and two front wheels 34.

The mower 20 further includes a handle 36 attached to the rear portion 26 of the deck 24. The handle 36 extends upward and rearward from the rear portion 26 of the deck 24 to a location suitable for an associated operator to maneuver the mower 20 in a relatively convenient manner, as is typical of many walk-behind mowers. The handle 36 includes a distal end 38, and the distal end 38 can include a crossbar 40 for the associated operator to push and pull the handle 36, and thus, the mower 20.

Figure 2:
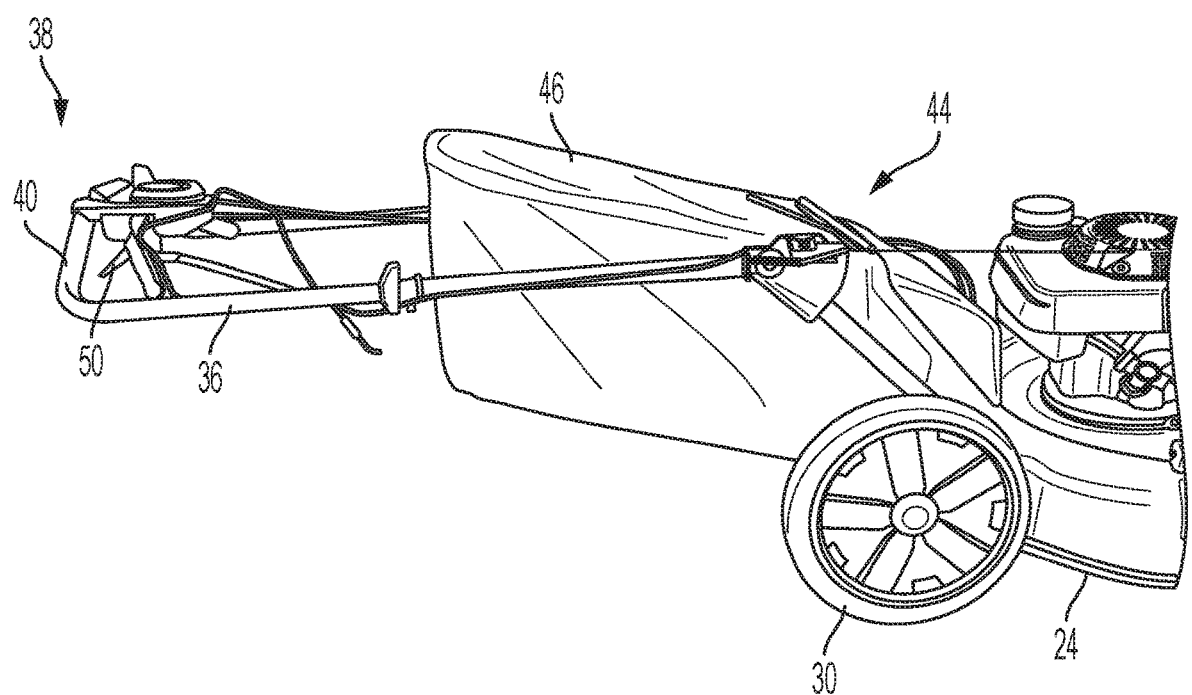
FIG. 2 is a side view of the walk-behind mower of FIG. 1 showing a handle in a second position.

The mower 20 further includes structure 44 to enable the distal end 38 of the handle 36 to be selectively located in a plurality of positions. FIG. 1 shows the handle 36 in a typical position for a walk-behind mower, or a "first position." Turning to FIG. 2, the walk-behind mower 20 is shown with the handle 36 in a dropped down position, or what we may term a "drop handle" position or a "second position." As is shown in FIGS. 1 and 2, the second position is at a lower elevation than the first position. As can be seen in FIG. 2, a full clippings collection bag 46 can be removed from the mower 20 by lifting the bag 46 up and away from the mower 20 with a shorter upward movement when the handle 36 is in the second position.

The structure 44 includes a hinge 48 such that a portion of the handle 36 can rotate the distal end 38 between the plurality of positions. Any suitable hinge 48 is acceptable, but in the shown examples, the hinge 48 is a screw or bolt between two sections of the handle 36. These components of the structure 44 will be shown and discussed in greater detail below.

FIG. 2 also shows a lever 50 attached to the handle 36 proximate the distal end 38 and a cable 54 that is connected at one end to the lever 50 and at the other end to the structure 44 wherein the lever 50 enables movement of the handle 36 between the plurality of positions.

Figure 3:
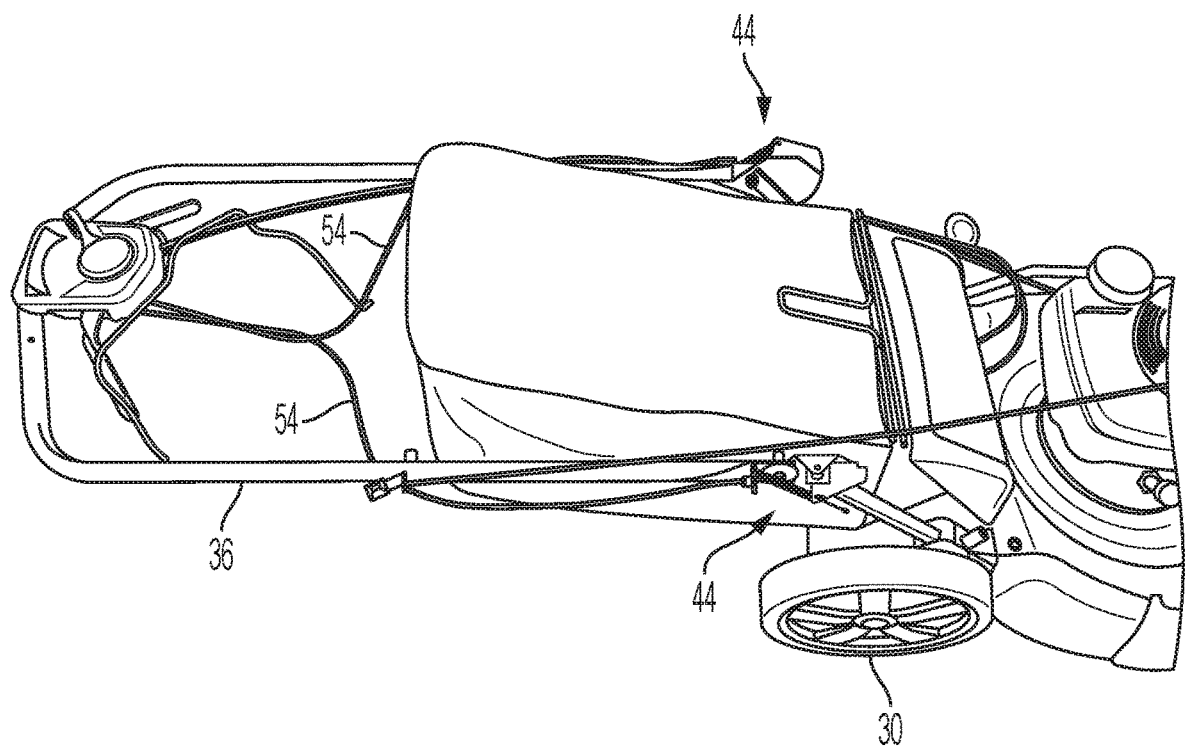
FIG. 3 is a top perspective view of the walk-behind mower of FIG. 1.

Turning to FIG. 3, there could be one cable 54 that is connected to the lever 50 and operates structure 44 on one side of the handle 36. However, in the shown examples, there are two cables 36 connected to the lever 50. Each cable 54 goes down one side of the handle 36 to effect operation of the structure 44 on that side of the handle 36. Motion or activation of the lever 50 urges movement in the cable 54 that urges a motion in the structure 44.

Figure 4:
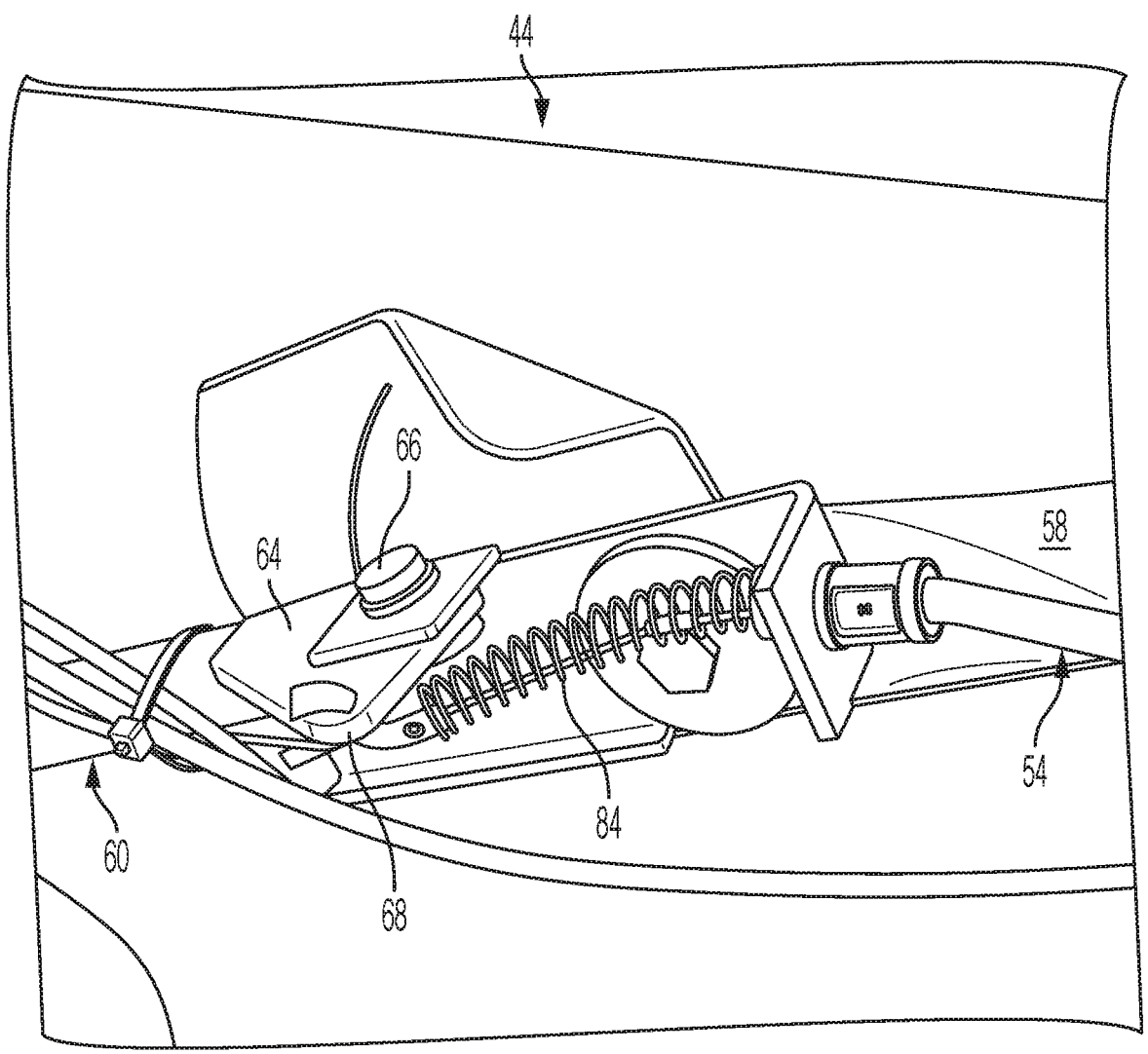
FIG. 4 is a detail view of a structure on the handle of the mower of FIG. 1 showing the handle in the first position.

Turning to FIG. 4, a detail view of the structure 44 on one side of the handle 36 is shown. The handle 36 can be described as having two sections; an upper section 58 that goes to the distal end 38 of the handle 36 and a lower section 60 that goes to the mounting location at the deck 24. The cable 54 is attached to a rotatable plate 64 that rotates about the screw 66. As the lever 50 is operated, the inner core of the cable 54 is pulled toward the distal end 38 of the handle 36. This pulls at the connection point 68 between the cable 54 and the rotatable plate 64, to urge motion (i.e., rotation) of the rotatable plate 64.

Figure 5:
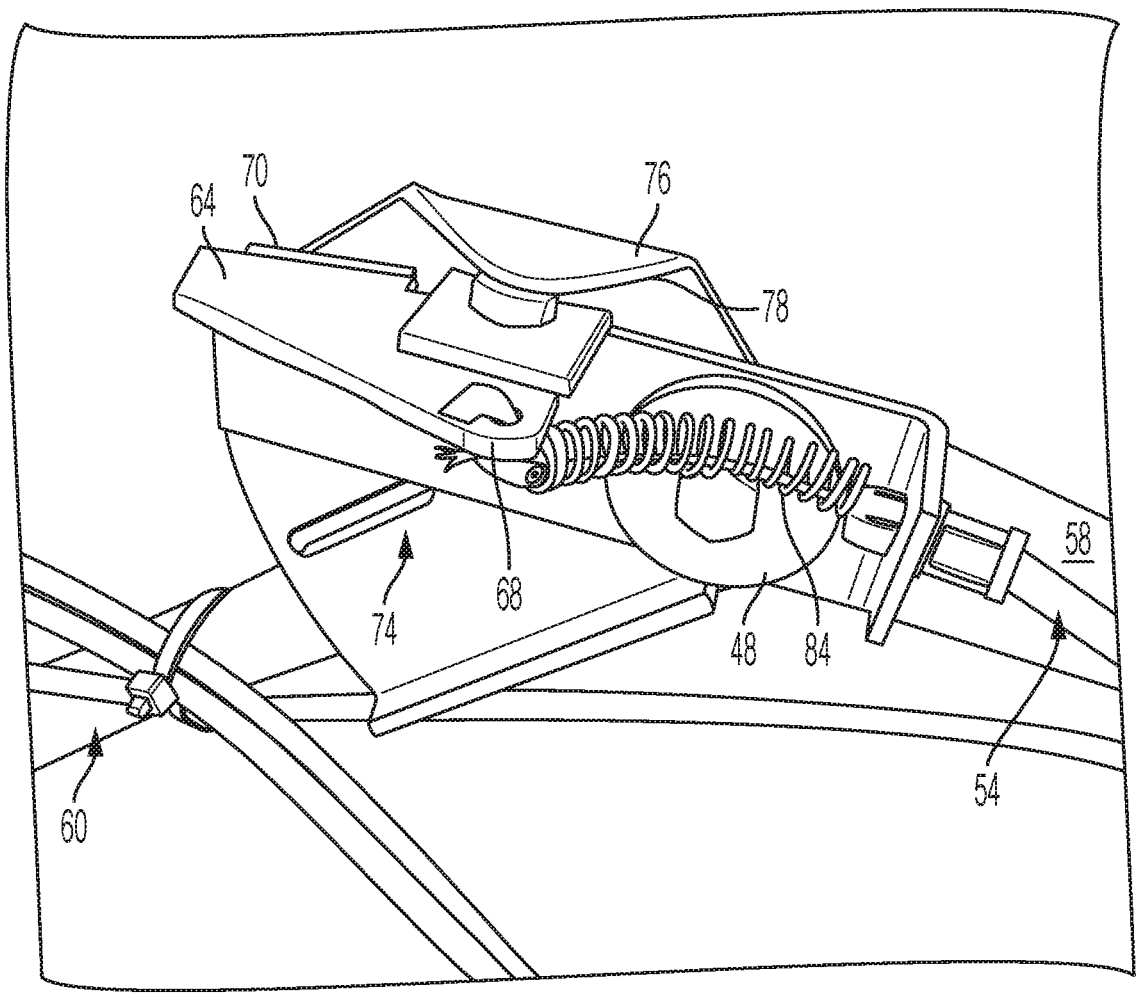
FIG. 5 is similar to FIG. 4 showing the handle in a second position.

Turning to FIG. 5, rotation of the rotatable plate 64 moves the tab 70 out of the slot 74 located on an L-shaped bracket 76 located on the lower section 60 of the handle 36. With the tab 70 removed from the slot 74, the upper section 58 of the handle 36 is free to rotate about the hinge 48 which can be a screw or bolt or other suitable apparatus. The structure 44 includes a physical stop 78 such that there is a selected limit to a movement of the handle 36 between the plurality of positions. The screw 66 contacts the physical stop 78 to limit this movement, particularly at the bottom limit for the second position. FIG. 5 shows the handle in the second or drop handle position.

Returning to FIG. 4, and also to FIG. 5, the plurality of positions includes an uppermost position (i.e., first position) and the structure 44 includes a lock to maintain the handle 36 in the uppermost position. The lock is the tab 70 and slot 74 arrangement that is best seen in FIG. 5. A biasing member 84, such as a spring, urges the rotatable plate 64 toward the L-shaped bracket 76 so that when the handle 36 reaches its uppermost position, the tab 70 will enter the slot 74 and lock the handle in place. When the operator desires to move the handle to another position, the lever 50 is moved or actuated to move the cable 54 again to rotate the rotatable plate 64 removing the tab 70 from the slot 74 and unlocking the handle 36.

Figure 6:
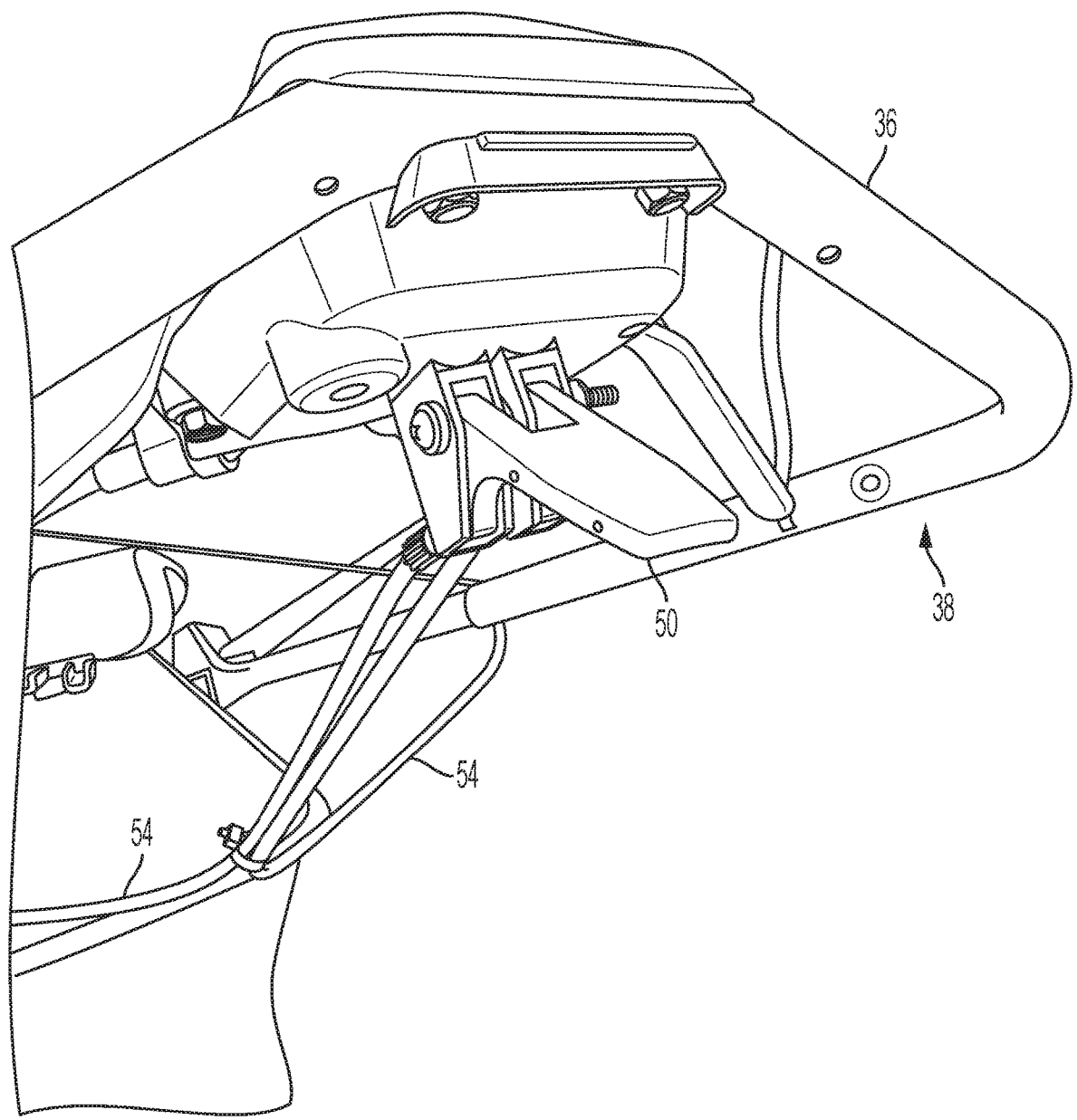
FIG. 6 is a detail view of a distal end of the handle showing the mounting arrangement of an example lever.

FIG. 6 shows the mounting arrangement of an example lever 50 proximate to the distal end 38 of the handle 36.

Figure 7:
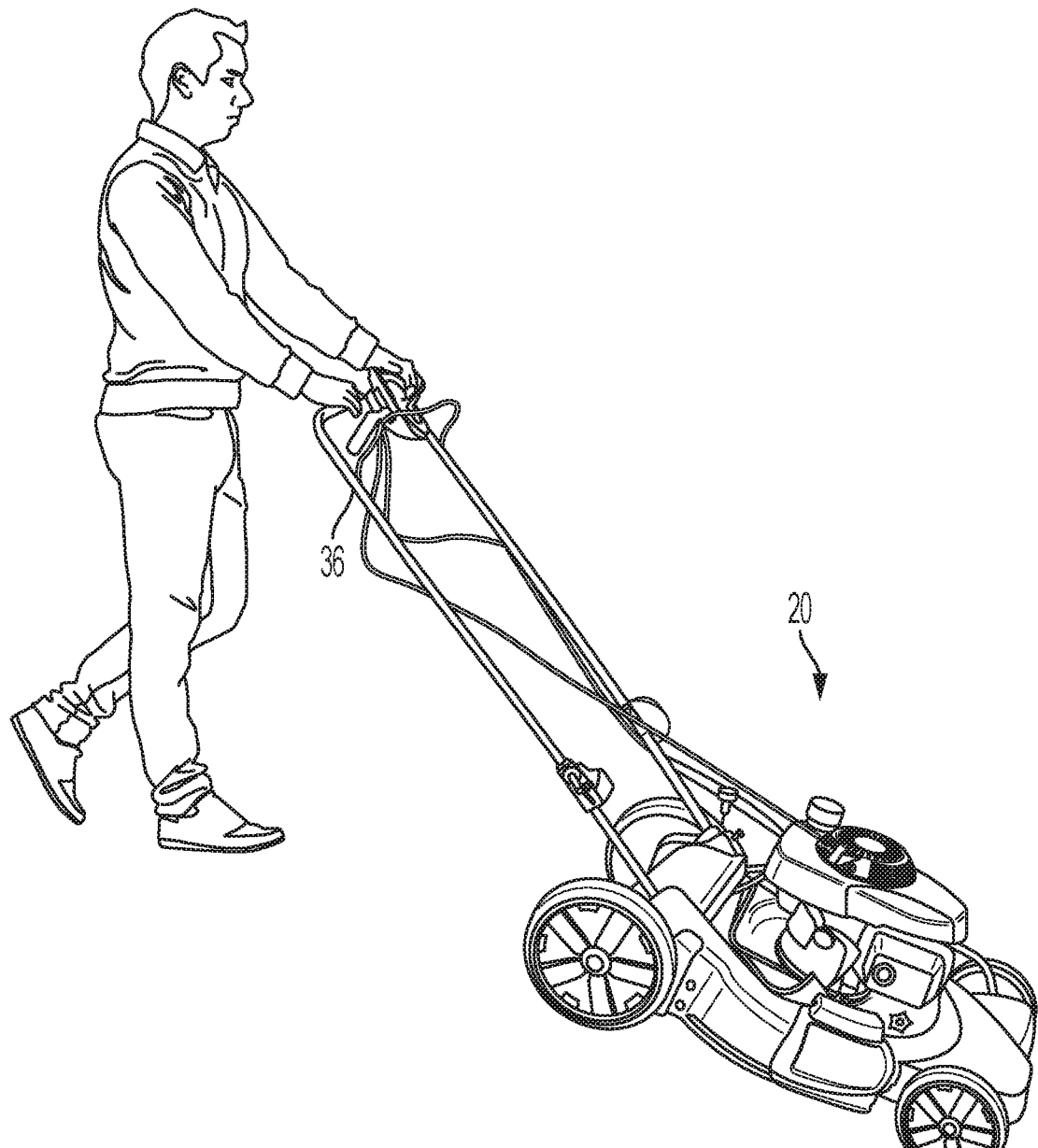
FIG. 7 shows an operator operating the mower on an incline with the handle in the first (uppermost) position.
Figure 8:
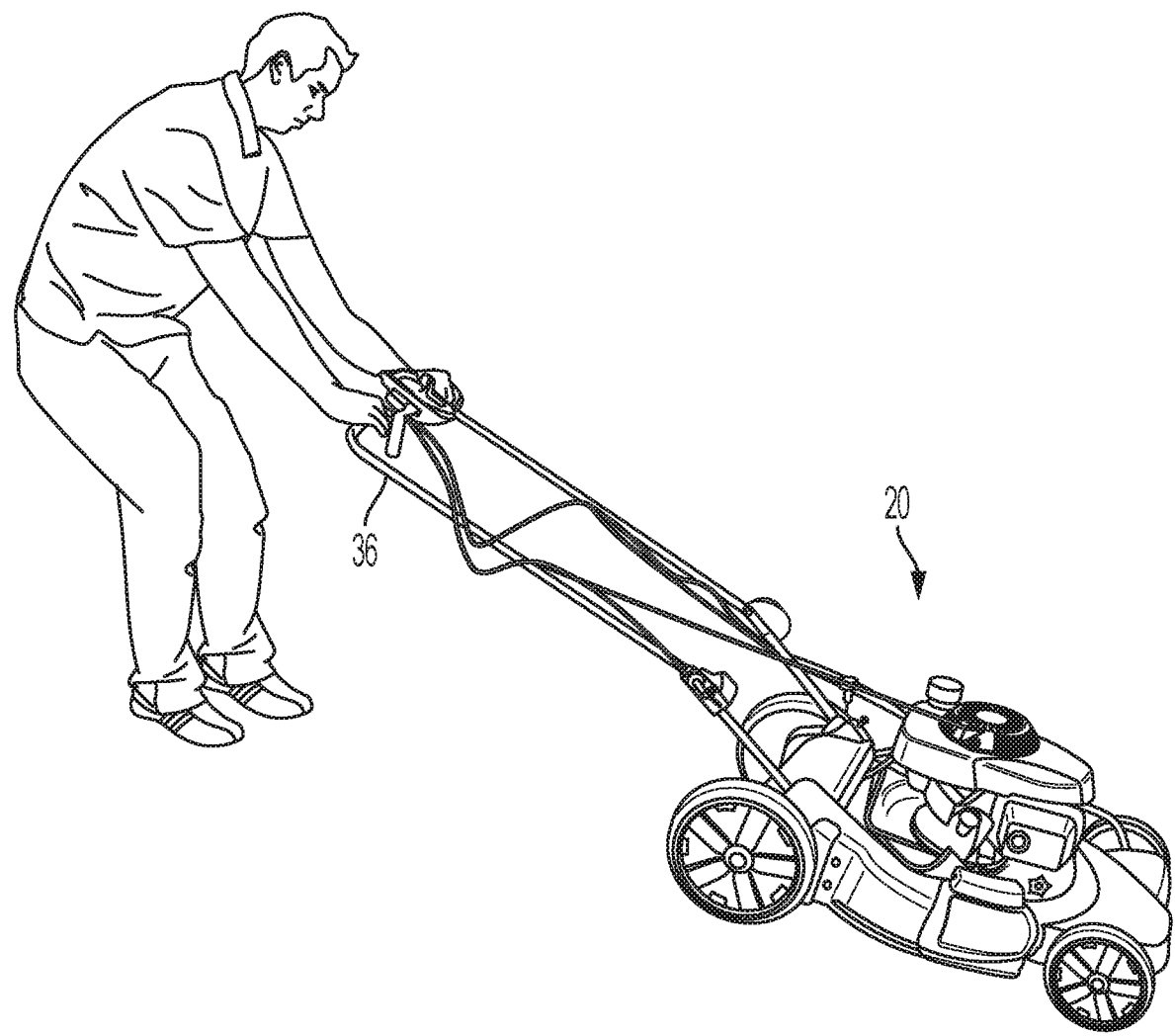
FIG. 8 is similar to FIG. 7, showing the handle in the second position.

FIG. 7 shows an operator operating the mower 20 on an incline with the handle 36 in the first (uppermost) position. FIG. 8 shows an operator operating the mower 20 on an incline with the handle 36 in the second (drop handle) position.

Several additional handle positions between the described first and second positions are also contemplated.

Figure 9:
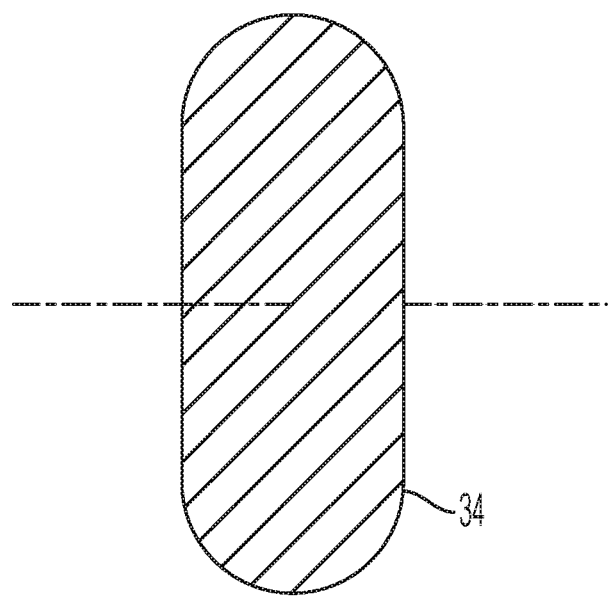
FIG. 9 is a cross-sectional view of an example rounded cross-section front wheel.

Returning to FIG. 1, and also turning to FIG. 9, the front wheels 34 of the mower 20 can have a rounded cross-sectional profile in order to limit the contact area between the wheel 34 and a driven surface. This is evidenced by the thin line of dirt 90 around the wheel 34 shown in FIG. 1. This limited contact area can significantly reduce the amount of friction and effort required to turn the mower 20 at the ends of mowed rows, or other turning operations. The wheel 34 can be a cross between the low-friction caster wheels seen on many riding mowers, particularly zero-turn mowers, and fixed front wheels of walk-behind mowers. The cross-sectional area of the front wheel 34 is best shown in FIG. 9.

There can be several benefits to the apparatus disclosed herein. The described structure can enable an operator to more easily follow the contour of hill while cutting grass and other vegetation. The handle can move to accommodate that and can eliminate the need to lift the front end of the mower during the time when the mower is pulled back up a hill or side of a ditch. Additionally, the apparatus can encourage less energy usage on the part of the operator by reducing and/or eliminating over-the-head operation on certain inclined surfaces. Also, the drop handle mower can ease the operation of bag removal by limiting the necessary lift to get the clippings collection bag over the handle. Finally, the rounded cross-section front wheels can limit energy consumption on the part of the operator by limiting the friction involved in turning the mower.

In summary, a walk-behind mower 20 includes a deck 24. The deck 24 includes a rear portion 26, a power source 28 attached to the deck 24, a plurality of wheels 30, 34 attached to the deck 24, and a handle 36 attached to the rear portion 26 of the deck 24. Structure is included to enable a distal end 38 of the handle 36 to be selectively located in a plurality of positions. The handle 36 extends upward and rearward from the rear portion 26 of the deck 24.

While the disclosure has been illustrated and described in typical exemplary embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. A walk-behind mower comprising:
    a deck, the deck comprising a rear portion;
    a power source attached to the deck;
    a plurality of wheels attached to the deck;
    a handle attached to the rear portion of the deck, wherein the handle extends upward and rearward from the rear portion of the deck, the handle including a distal end and a lever attached to the handle proximate the distal end, the handle comprising an upper section that goes into the distal end, and a lower section that goes into the deck; and
    a structure to enable the upper section of the distal end of the handle to be selectively located in a plurality of positions, wherein the structure includes a hinge and a cable, the cable being connected to the lever and the structure, wherein the structure comprises a rotatable plate attached to the cable, such that the upper section of the distal end of the handle can rotate between the plurality of positions.

2. The walk-behind mower of claim 1, wherein the plurality of positions include a first position and a second position, the second position being at a lower elevation than the first position.

3. The walk-behind mower of claim 1, wherein the structure includes a physical stop such that there is a selected limit to a movement of the handle between the plurality of positions.

4. The walk-behind mower of claim 3, wherein the physical stop is configured to limit the movement of the handle at a bottom limit.

5. The walk-behind mower of claim 1, wherein the plurality of positions includes an uppermost position and the structure includes a lock to maintain the handle in the uppermost position.

6. The walk-behind mower of claim 1, wherein operation of the lever urges movement in the cable that urges a motion of the rotatable plate.

7. The walk-behind mower of claim 1, wherein the handle further comprises two sides such that each side is attached to the deck, and a portion of the structure is located on each side of the handle.

8. The walk-behind mower of claim 7, wherein the lever enables movement of the handle between the plurality of positions.

9. The walk-behind mower of claim 8, further comprising two cables, wherein the cables are connected to the lever and to each portion of the structure such that operation of the lever urges movement in the cables that urge a motion in each structure.

10. The walk-behind mower of claim 1, wherein the wheels located at the front of the deck have a rounded cross-sectional profile to limit the contact area between the wheel and a driven surface.

* * * * *